United States Patent
Britton et al.

(10) Patent No.: US 9,367,358 B2
(45) Date of Patent: Jun. 14, 2016

(54) VIRTUALIZING A SET OF MANAGERS TO FORM A COMPOSITE MANAGER IN AN AUTONOMIC SYSTEM

(75) Inventors: Kathryn H. Britton, Chapel Hill, NC (US); Nicholas D. Butler, Romsey (GB); Peter J. Brittenham, Pittsboro, NC (US); Brent A. Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2228 days.

(21) Appl. No.: 11/382,104

(22) Filed: May 8, 2006

(65) Prior Publication Data

US 2007/0260642 A1 Nov. 8, 2007

(51) Int. Cl.
- G06F 9/50 (2006.01)
- G06F 9/455 (2006.01)
- G06Q 10/06 (2012.01)
- G06Q 10/10 (2012.01)

(52) U.S. Cl.
CPC .............. *G06F 9/5061* (2013.01); *G06Q 10/06* (2013.01); *G06Q 10/10* (2013.01); *G06F 9/455* (2013.01)

(58) Field of Classification Search
None
See application file for complete search history.

(56) References Cited

U.S. PATENT DOCUMENTS

| 6,662,222 B2 | 12/2003 | Ishii et al. |
| 2002/0188708 A1 | 12/2002 | Takahashi et al. |
| 2003/0229688 A1 | 12/2003 | Liang |
| 2004/0049500 A1 | 3/2004 | Donatelli et al. |
| 2004/0148138 A1 | 7/2004 | Garnett et al. |
| 2004/0215761 A1 | 10/2004 | Fujii et al. |
| 2005/0005272 A1 | 1/2005 | Moody et al. |
| 2005/0044209 A1 | 2/2005 | Doyle et al. |
| 2005/0097146 A1 | 5/2005 | Konstantinou et al. |
| 2005/0172291 A1* | 8/2005 | Das et al. ................ 718/104 |
| 2007/0174075 A1* | 7/2007 | Franke .................. G06F 21/552 |
| | | 705/302 |
| 2007/0226028 A1* | 9/2007 | Britton ............ G06Q 10/06311 |
| | | 705/7.13 |

OTHER PUBLICATIONS

Gerald Tesauro, David M. Chess, William E. Walsh, et al., A Multi-Agent Systems Approach to Autonomic Computing, International Conference on Autonomous Agents, Jul. 19-23, 2004, pp. 464-471.*

(Continued)

*Primary Examiner* — H S Sough
*Assistant Examiner* — Kimberly Jordan
(74) *Attorney, Agent, or Firm* — Charles L. Moore; Moore & Van Allen PLLC

(57) ABSTRACT

A composite manager may include a set of managers virtualized as a single entity. The composite manager may also include at least one of a module to provide a single manager interface for the set of managers to manage at least one entity, and a module to provide a single manageability interface for the set of managers relative to any managing entity of the composite manager.

29 Claims, 7 Drawing Sheets

(56) References Cited

OTHER PUBLICATIONS

IBM, An architectural blueprint for autonomic computing, Jun. 2005, Third Edition.*
IBM Autonomic Computing White Paper; An architectural blueprint for autonomic computing; Oct. 4, 2004; 33 Pages.*
IBM Autonomic Computing White Paper; An architectural blueprint for autonomic computing; Jun. 2005, Second Edition; 34 Pages.*
IBM Autonomic Computing White Paper; An architectural blueprint for autonomic computing; Apr. 2003; 37 Pages.*
Richard Murch; Autonomic Computing; IBM Press; Mar. 24, 2004; 12 Pages.*
Shortley, Tim et al.; Integrated Solutions Console: a unified portal for autonomic systems; IBM DeveloperWorks Live!, New Orleans, LA, Apr. 9-12, 2003; 15 pages.*
Kephart, Jeffrey, O. and Chess, David M., The Vision of Autonomic Computing, IEEE Computer Society, Jan. 2003, pp. 41-50.
IBM Research, http://www.research.ibm.com/autonomic/overview/solution.html, printed Feb. 7, 2006, 6 pages.
Bell, Jason, Understand the Autonomic Manager Concept, http://www-128.ibm.com/developerworks/library/ac-amconcept, Feb. 17, 2004, pp. 1-6.

* cited by examiner

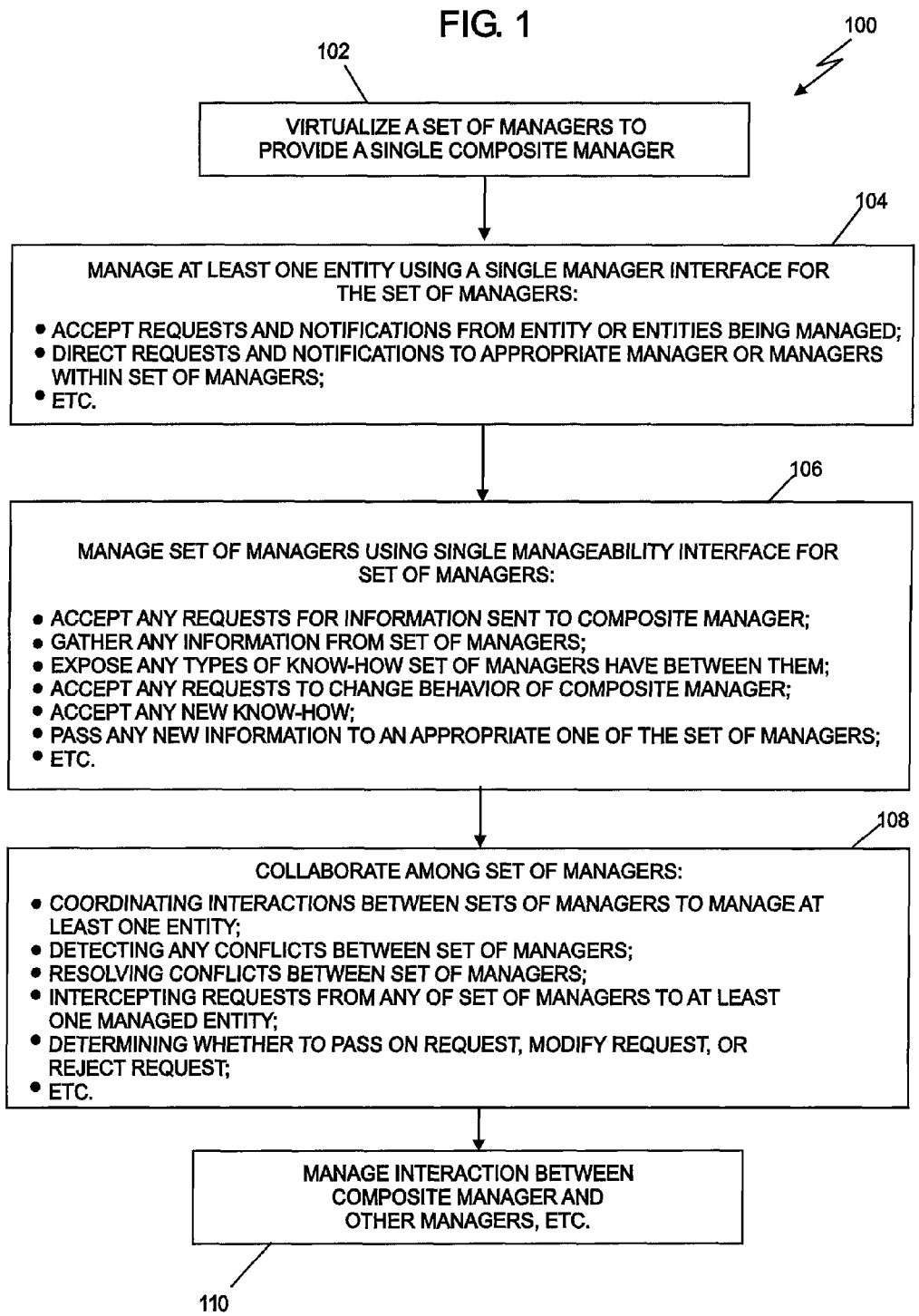

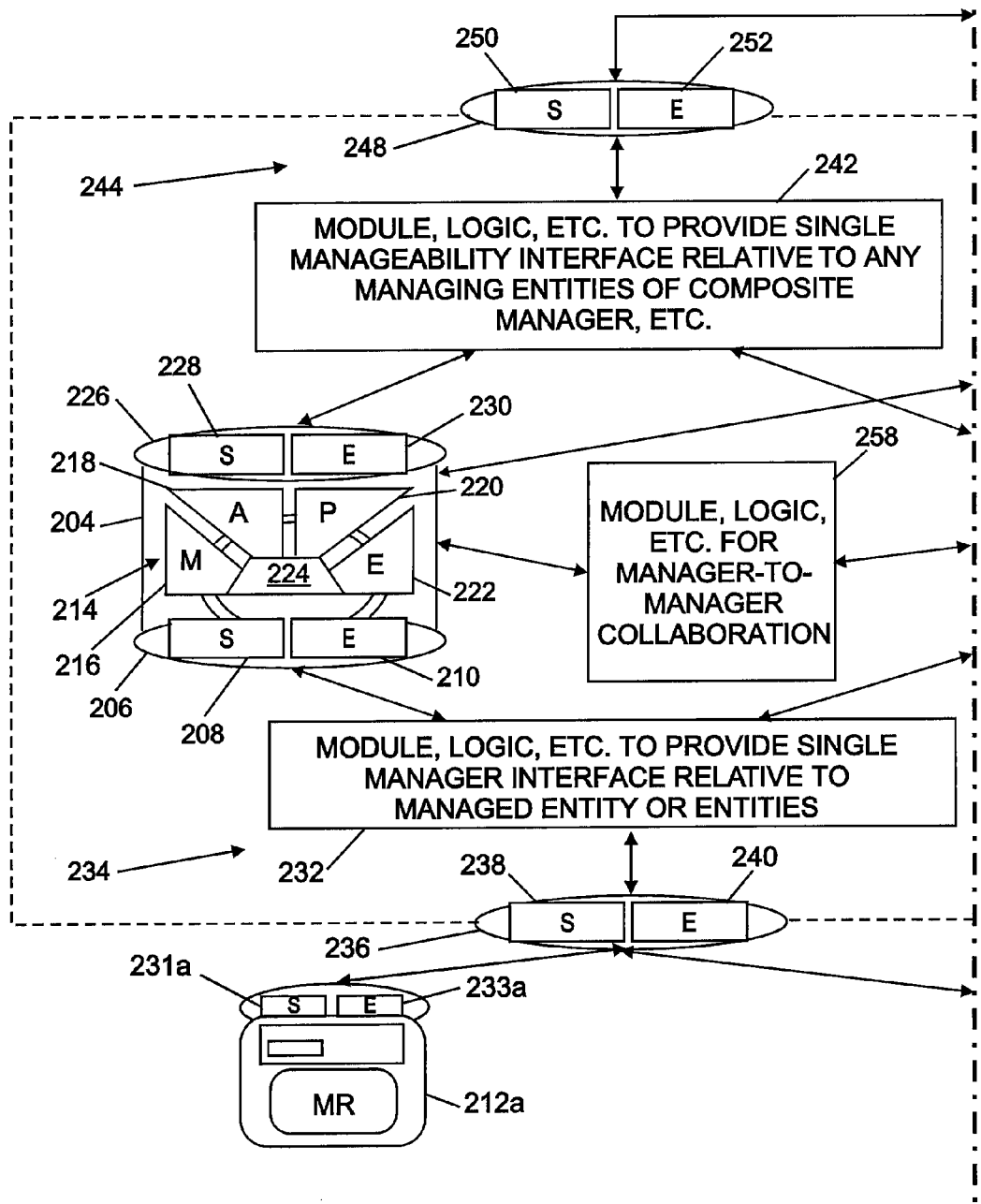

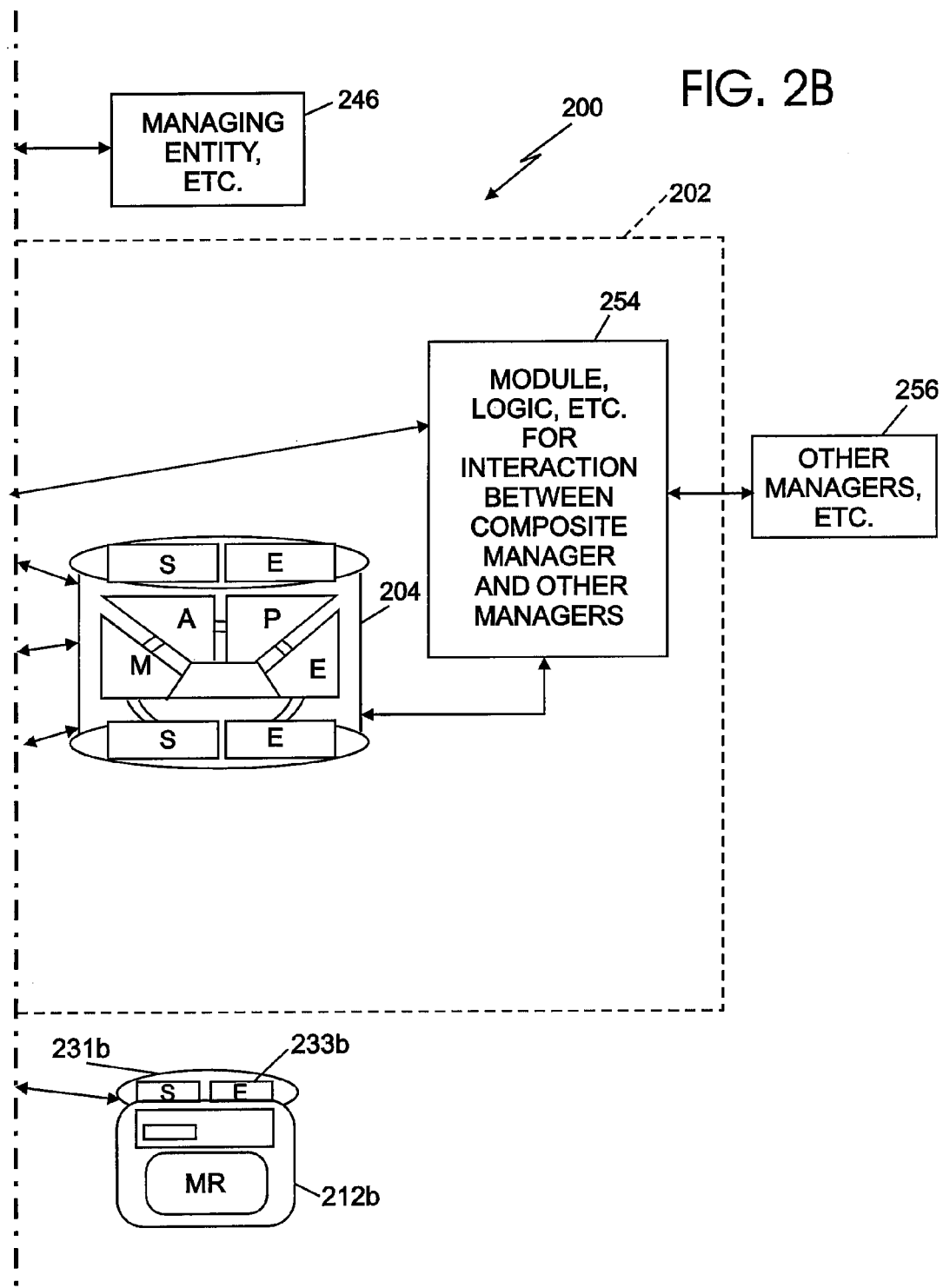

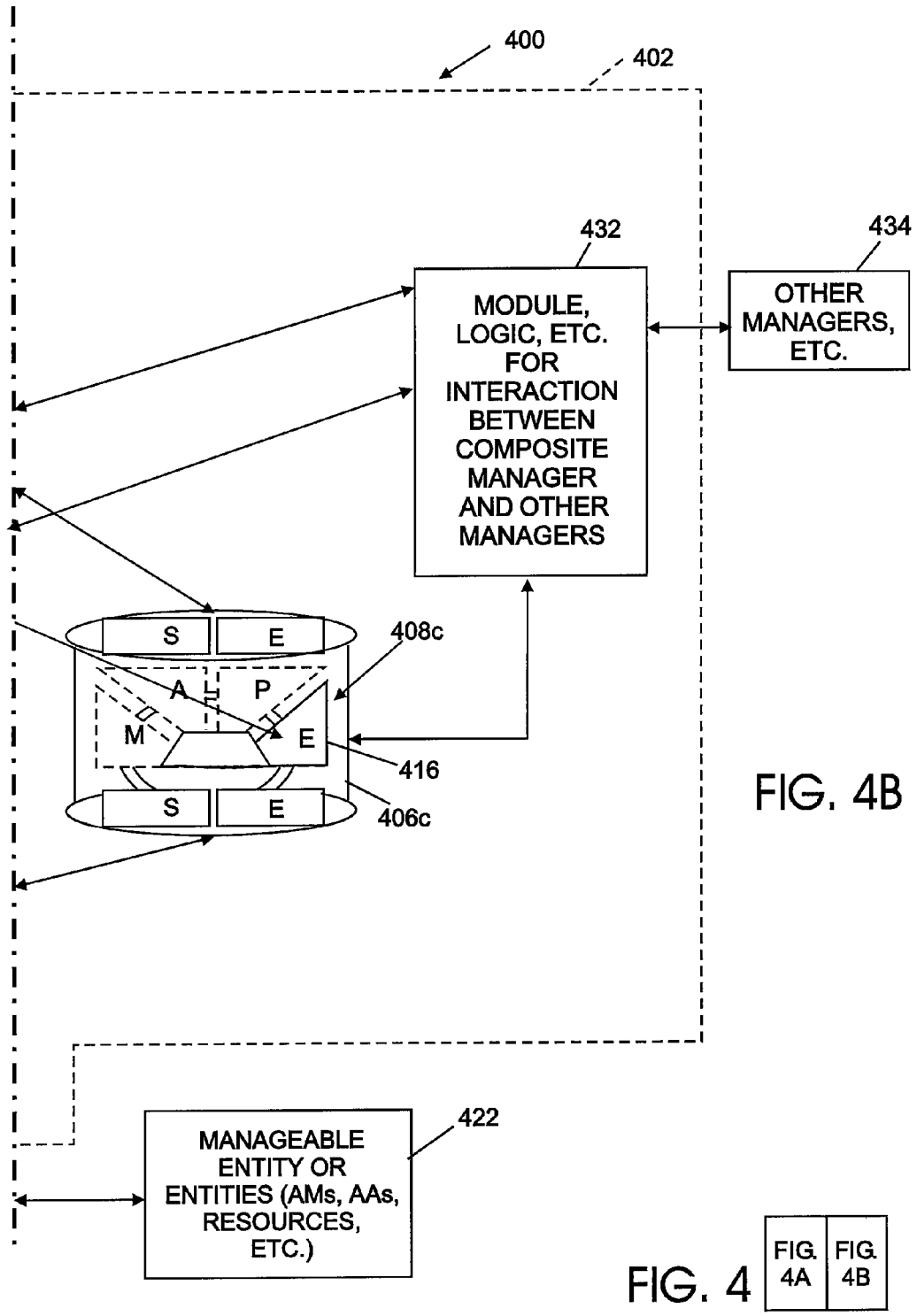

VIRTUALIZING A SET OF MANAGERS TO FORM A COMPOSITE MANAGER IN AN AUTONOMIC SYSTEM

BACKGROUND OF THE INVENTION

The present invention relates to autonomic computing, autonomic systems or the like, and more particularly to virtualizing a set of managers to form a composite manager in an autonomic system.

Autonomic computing technology is based on creating system components referred to as autonomic managers that can perform actions that make systems more self-managing. An autonomic manager may perform a closed autonomic computing loop, such as a monitor-analyze-plan-execute (MAPE) loop or the like. Accordingly, the autonomic computing loop may involve the operations of monitoring a manageable entity, analyzing any data or information received, planning any actions as a result of the analysis and executing the actions. Autonomic systems may also include manual managers that allow human interaction with the autonomic system.

In autonomic systems, it may be common for multiple autonomic or manual managers to work together to manage various aspects of the same managed entity or entities, such as resources, other autonomic managers, manual managers or the like. Such coordinated management may be complicated and may present challenges that need to be met. For example, the managed entities or resources may need to send notifications or make requests to multiple managers. Managers may interact to share management of resources in a number of different ways but when combined need to be included in a more complex autonomic system. There may be conflicts that may need to be detected and resolved. Requests from managers to resources or vice versa may need to be dealt with differently when combined with other managers than when the manager is independent, as well as other possible coordination matters.

BRIEF SUMMARY OF THE INVENTION

In accordance with an embodiment of the present invention, a composite manager may include a set of managers virtualized as a single entity. The composite manager may also include at least one of: a module to provide a single manager interface for the set of managers to manage at least one entity, and a module to provide a single manageability interface for the set of managers relative to any managing entity of the composite manager.

In accordance with another embodiment of the present invention, an autonomic system may include at least one composite manager. The composite manager may include a set of managers virtualized as a single entity. The composite manager may also include at least one of: a module to provide a single manager interface for the set of managers to manage at least one entity, and a module to provide a single manageability interface for the set of managers relative to any managing entity of the composite manager.

In accordance with another embodiment of the present invention, a method to manage a system, such as an information technology (IT) system or the like, may include using a set of managers virtualized as a composite manager. The method may also include at least one of: managing at least one entity using a single manager interface for the set of managers, and managing the composite manager using a single manageability interface.

In accordance with another embodiment of the present invention, a computer program product to share system management responsibility may include a computer usable medium having computer usable program code embodied therein. The computer usable medium may include computer usable program code configured to provide a set of managers virtualized as a composite manager. The computer usable medium may also include computer usable program code configured to provide at least one of: a single manager interface for the set of managers to manage at least one entity, and a single manageability interface for the set of managers relative to any managing entity of the composite manager.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE SEVERAL VIEWS OF THE DRAWINGS

FIG. 1 is a flow chart of an example of a method to manage a system in accordance with an embodiment of the present invention.

FIG. 2 is a block diagram of an exemplary system including a composite manager in accordance with an embodiment of the present invention.

DETAILED DESCRIPTION OF THE INVENTION

Figure 3A:
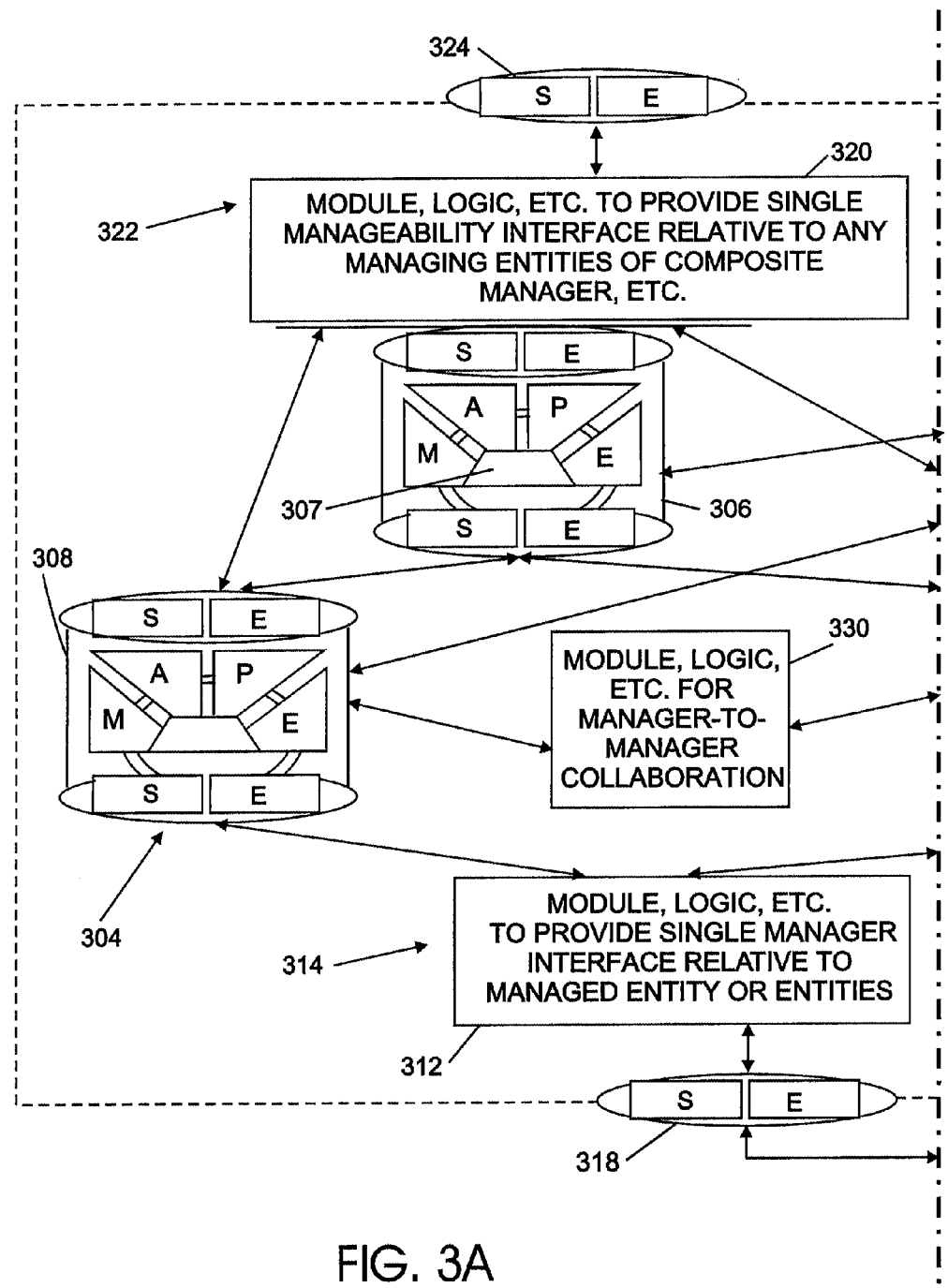
FIG. 3 is a block diagram of an exemplary system including a composite manager in accordance with another embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a flow chart of an example of a method 100 to manage a system in accordance with an embodiment of the present invention. In block 102, a set of managers (autonomic managers or manual managers) may be virtualized to provide a composite manager as described herein in more detail. Being virtualized may be defined as the set of managers being consolidated or combined in such a manner that they collectively represent or behave substantially like a single manager to any external entities, such as managed entities (resources, etc.), other autonomic or manual managers, a managing entity that may monitor and control the composite manager, or similar entities. In block 104, at least one manageable entity may be managed by using a single manager interface for the set of managers or composite manager. The single manager interface may be adapted to perform at least one of a group of functions or operations that may include, but is not necessarily limited to accepting requests and notifications from an entity or entities being managed by the set of managers or composite manager; directing requests and notifications to the appropriate manager or managers within the set of managers; or other functions or operations that may be associated with managing an entity or multiple entities.

In block 106, the set of managers may be managed by using a single manageability interface. The single manageability interface for the set of managers may be adapted to perform at least one of a group of functions or operations that may include, but is not necessarily limited to accepting any requests for information sent to the composite manager; gathering any information from the set of managers; exposing any types of know-how the set of managers have between them; accepting any requests to change behavior of the composite manager; accepting any new know-how; passing any new information to an appropriate one of the set of managers; or other similar operations. The single manageability interface is for the set of managers so any entity or entities that may be monitoring and controlling the composite manager have a single coordinating interface to the set of managers.

In block 108, the set of managers may collaborate between themselves. Collaboration between the set of managers may include but is not necessarily limited to coordinating interactions between the set of managers to manage one or more entities; detecting any conflicts; resolving any conflicts; intercepting any requests from any of the set of managers or from a managed entity to the set of managers; determining whether to pass on any request, modify any request, or reject any request; accepting requests and notifications from the entity or entities and directing them to the appropriate manager or managers within the set of managers; or any other functions between the set of managers that may need coordination. The logic for coordinating between the managers may be similar to that used if the managers were not virtualized into a composite manager. However, the logic would have to be separately provided and configured outside of the managers involved and the interfaces would be separately exposed. With the architecture of the present invention, the collaboration logic or module is contained within the composite manager and is the responsibility of the composite manager to maintain. The collaboration logic provides a single manager interface to the set of managers so any entity or entities that the composite manager is managing and controlling have a single interface to the set of managers.

In block 110, interaction may be managed between the composite manager and other managers or entities. Accordingly, another single interface or logic module may be contained within the composite manager to interface between the set of managers and any external manager or other entity.

FIG. 2 is a block diagram of an exemplary system 200 including a composite manager 202 in accordance with an embodiment of the present invention. The method 100 or elements of the method 100 may be embodied in the system 200. The composite manager 202 may include a set of managers 204 that may be virtualized as a single entity. Similar to that previously described, by being virtualized, the set of managers 204 may be consolidated or combined such that they collectively appear like or behave substantially like a single manager to any external entities, such as managed entities (resources, etc.), other autonomic or manual managers, a managing entity (autonomic manager, manual manager, etc.) that monitors or controls the composite manager 202, or similar entities.

The set of managers 204 may include all autonomic managers, all manual managers or a combination of both. The exemplary composite manager 202 in FIG. 2 is illustrated as including all autonomic managers. Briefly described, each autonomic manager 204 may include a manager interface 206. The manager interface 206 may include a sensor interface 208 and an effector interface 210. In an independent autonomic manager, the sensor interface 208 and effector interface 210 may monitor and control a managed entity, such as a manageable resource or the like. In the composite manager 202, the manager interface 206 of each of the set of managers 204 may interface with a module 232, logic or the like to provide a single overall or composite manager interface 234 relative to any entity or entities managed by the composite manager 202, such as manageable resources 212a, 212b. The manageable resources 212a, 212b or entities may also be an autonomic manager or managers, a manual manager or managers or other manageable entity or entities.

The autonomic manager 204 may also include an autonomic computing loop 214 or MAPE loop. The autonomic computing loop 214 may include a monitor function or module 216, an analyze function or module 218, a plan function or module 220 and an execute function or module 222. The autonomic computing loop 214 may be operable in a piece of hardware that may be a processor.

The monitor function 216 may provide mechanisms that collect, aggregate, filter, correlate and report details, such as metrics, topologies or the like collected from manageable entities, such as the manageable entities or resources 212a, 212b in FIG 2.

The analyze function 218 may provide mechanisms that model complex situations, for example, time-series forecasting, queuing models or other models of situations. The analyze function may use policy information as a guide. These analyze mechanisms allow the autonomic manager 204 to learn about the environment and help predict future situations.

The plan function 220 may provide mechanisms that construct the actions needed to achieve goals and objectives. The execute function 222 may provide the mechanisms that control the execution of a plan, which may involve executing operations of one or more managed entities, such as the managed entities 212a, 212b. These four parts 216-222 of the MAPE loop 214 may work together to provide the control loop functionality of the autonomic manager 204.

The four parts 216-222 communicate and collaborate with one another and exchange appropriate knowledge and data. The four parts may store and acquire knowledge or data from a knowledge base 224.

The autonomic manager 204 may also include manageability interface 226. The manageability interface 226 may include a sensor interface 228 and an effector interface 230. The sensor interface 228 and effector interface 230 may be substantially the same as the sensor and effector interfaces 231a, 231b and 233a, 233b, respectively, on the one or more managed entities 212a, 212b that the autonomic manager 204 would use to monitor and control those entities or resources. In an independent application, the manageability interface 226 may permit other autonomic managers and other components in the system 200 or distributed infrastructure to use the autonomic manager 204. As described in more detail herein, the manageability interface 226 may interface with a module 242, logic or the like to provide a single overall or composite manageability interface 244 relative to any managing entity or entities of the composite manager 202.

As previously described, even though an autonomic manager may be capable of automating the monitor, analyze, plan and executing parts of an autonomic computing loop, information technology (IT) professionals or the like can configure the autonomic manager to perform only part of its automated function. As described in more detail with respect to FIG. 4, an administrator might configure an autonomic manager to perform only the monitoring function. As a result, the autonomic manager would surface notifications through some form of user interface for the situations or symptoms that it recognizes, rather than automating the analysis, planning and execution functions associated with those actions. Thus, the functions not performed by an autonomic manager could be performed by a manual manager. Autonomic managers are described in more detail in "An Architectural Blueprint for Autonomic Computing" Third Edition, June 2005, available from the IBM Corporation.

Manual managers are described in more detail in U.S. patent application Ser. No. 11/277,397, entitled "Sharing Systems Management Responsibility with an Autonomic Manager" by Kathryn H. Britton et al. This application is assigned to the same assignee as the present invention and is incorporated herein by reference in its entirety.

As previously discussed, the composite manager 202 may also include the module 232, logic or the like adapted to provide a single overall or composite manager interface 234 for the set of managers 204 to manage at least one entity, such as manageable resources 212a, 212b or similar entities. The module 232 may be associated with a manager interface 236. Similar to manager interface 206, the manager interface 236 may include a sensor interface 238 and an effector interface 240. The module 232 and manager interface 236 may define the single overall or composite manager interface 234 for the set of managers 204 to manage the manageable resources 212a, 212b or other entities. The single overall or composite manager interface 234 may be adapted to perform functions or operations similar to those described with respect to block 104 of the method 100 in FIG. 1.

As previously discussed, the composite manager 202 may also include another or second module 242, logic or the like adapted to provide a single overall or composite manageability interface 244 for the set of managers 204 relative to any managing entity 246 of the composite manager 202. The module 242 may be associated with a manageability interface 248. The manageability interface 248 may be similar to the other manageability interface 226 and may include a sensor interface 250 and an effector interface 252. The module 242 and manageability interface 248 may define the single overall or composite manageability interface 244 for the composite manager 202. The single overall manageability interface 244 may be adapted to perform functions or operations similar to those described with respect to block 106 of the method 100 (FIG. 1).

The composite manager 202 may also include a third module 254, logic or the like for interaction between the composite manager 202 and any other managers 256 or entities. The module 254 may also define an interface.

The composite manager 202 may also include a module 258, logic or the like for the set of managers 204 to collaborate with one another. The collaboration module 258 may be adapted to perform functions or operations similar to those described with respect to block 108 of the method 100 of FIG. 1.

In one embodiment of the present invention, the modules 232, 242, 254 and 258 may be formable as a single module or as any combination of combined modules. In another embodiment of the present invention, an individual module may be constructed in a distributed way using normal application integration mechanisms, such as that provided by an enterprise service bus (standard middleware for connecting business applications) or other distributed architecture. The individual managers may be on several distributed systems with the collaboration logic implemented in the infrastructure, middleware or the like between the managers.

Figure 3B:
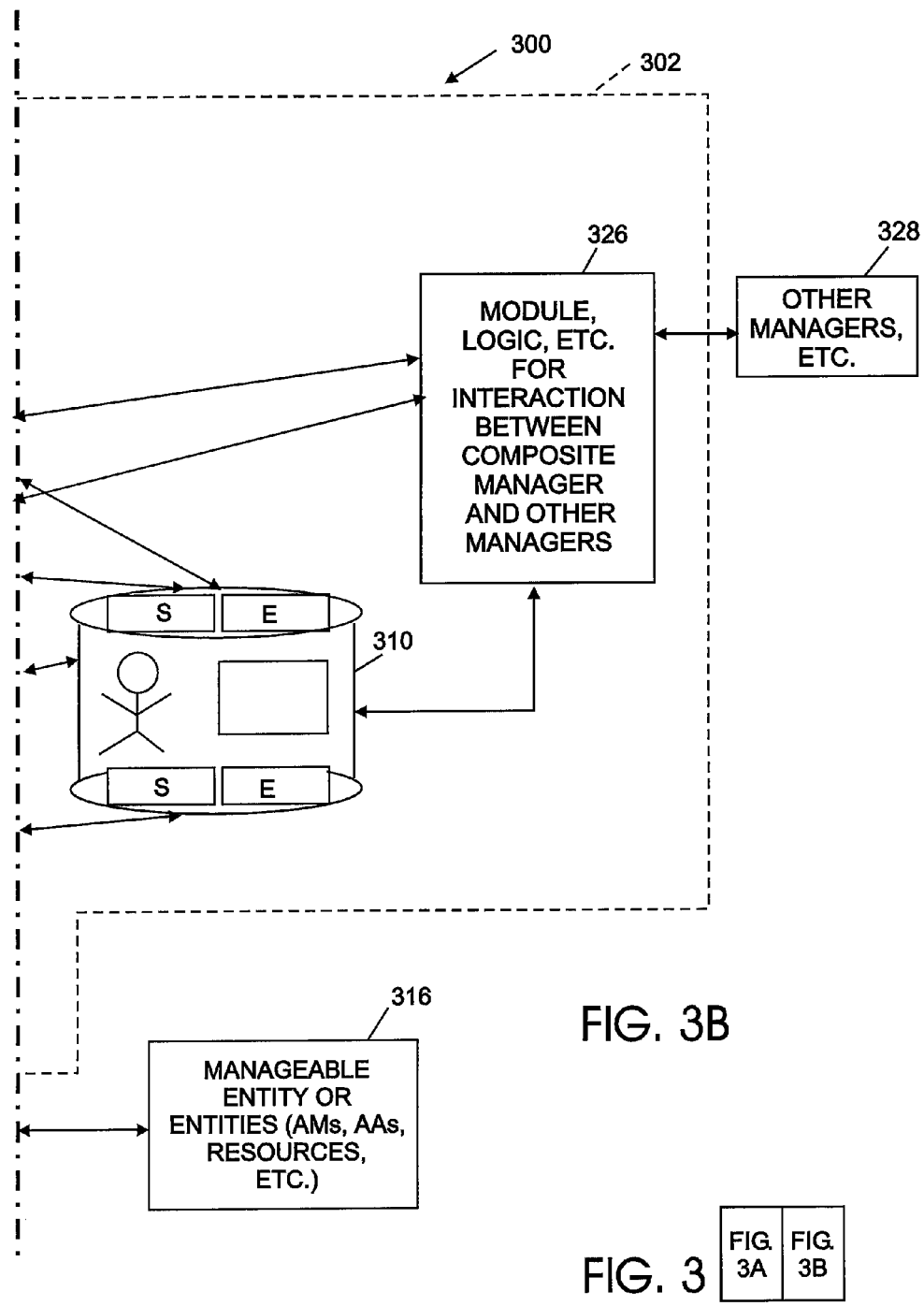

FIG. 3 is a block diagram of an exemplary system 300 including a composite manager 302 in accordance with another embodiment of the present invention. The composite manager 302 may include a set 304 of managers. The set 304 of managers may include an orchestrating manager 306 to manage at least two other managers 308 and 310. The other managers may be autonomic managers, similar to autonomic managers 204 described with reference to FIG. 2, manual managers, or a combination of both. In the example of FIG. 3, the manager 308 is an autonomic manager and the manager 310 is a manual manager. The orchestrating manager 306 may include similar components to the autonomic managers 204 described with reference to FIG. 2. The orchestrating manager 306 may include additional knowledge or know-how in its knowledge base 307 in order to manage or control operations among the other managers 304.

The composite manager 302 may also include a module 312, logic or the like adapted to provide a single overall or composite manager interface 314 for the set 304 of managers to manage at least one manageable entity 316. The module 312 may be similar to the module 232 of the composite manager 202 previously described with reference to FIG. 2. The manageable entity 316 or entities may be an autonomic manager (AM) or managers (AMs), a manual manager (MM) or managers (MMs), resources, or other type entities. The module 312 may be associated with an interface 318. The interface 318 may be similar to the manager interface 236 described with respect to the composite manager 202 of FIG. 2. The module 312 and the interface 318 may define the single overall or composite manager interface 314.

The composite manager 302 may also include another module 320, logic or the like adapted to provide a single overall or composite manageability interface 322 for the set 304 of managers relative to any managing entity or entities (not shown in FIG. 3) of the composite manager 302. The module 320 may be similar to the module 242 previously described with reference to the composite manager 202 of FIG. 2.

The module 320 may be associated with an interface 324. The interface 324 may be similar to the interface 248 described with respect to FIG. 2. The module 320 and the interface 324 may define the single overall or composite manageability interface 322.

The composite manager 302 may also include a module 326, logic or the like for interaction between the composite manager 302 and other managers 328 or entities. The module 326 may be similar to the module 254 of FIG. 2.

The composite manager 302 may further include a module 330, logic or the like for manager-to-manager collaboration in managing the manageable entity or entities 316. The module 330 may be similar to the module 258 described with respect to the composite module 202 in FIG. 2.

Figure 4A:
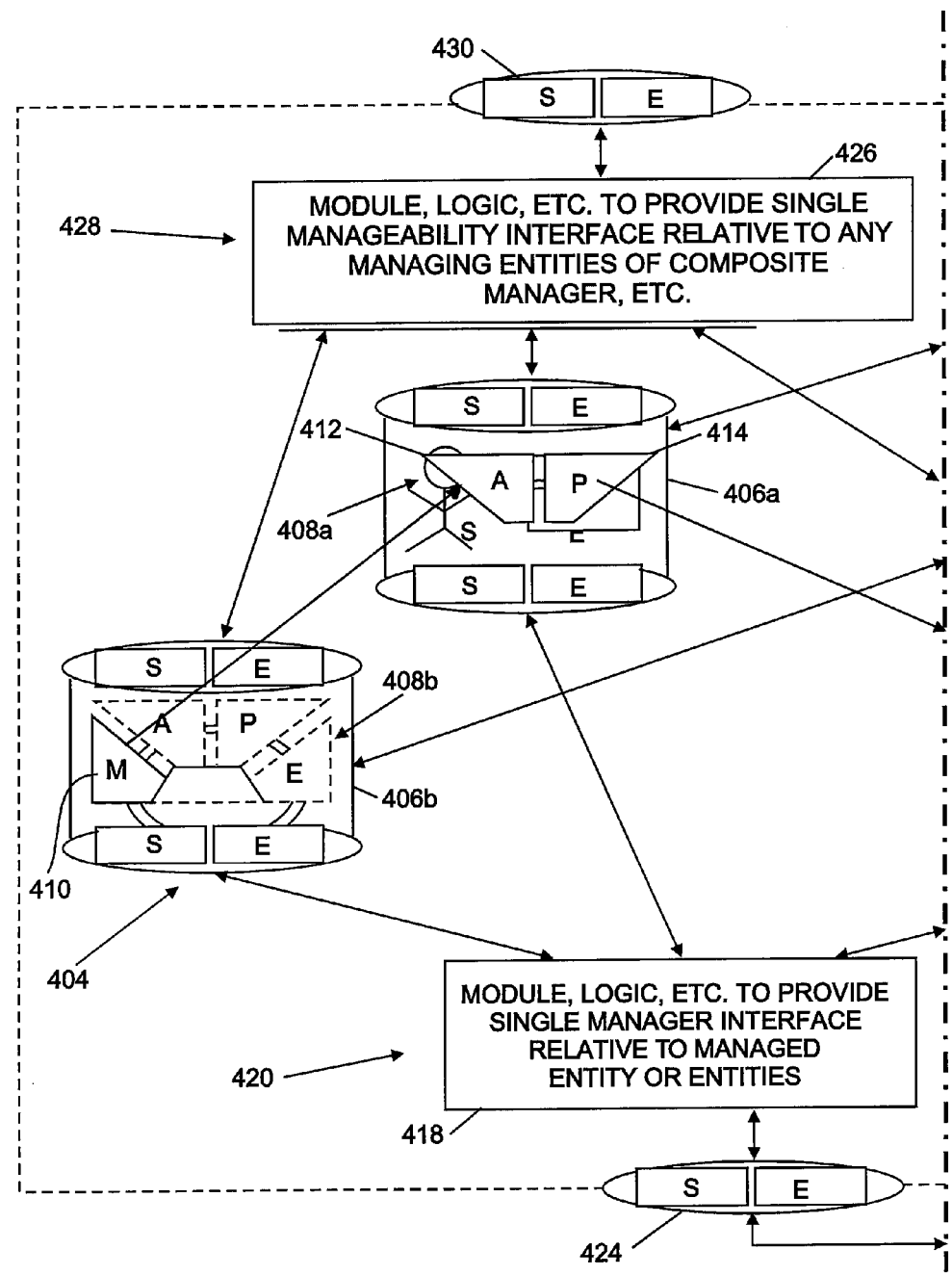
FIG. 4 is a block diagram of an exemplary system including a composite manager in accordance with a further embodiment of the present invention.

FIG. 4 is a block diagram of an exemplary system 400 including a composite manager 402 in accordance with a further embodiment of the present invention. The composite manager 402 may include a set 404 of managers. The set 404 of managers may include a plurality of partial managers 406. The partial managers 406 may include at least one manual manager 406a. The remaining partial managers 406 may be autonomic managers 406b and 406c. The partial managers 406 may each perform a predetermined part of the autonomic computing loop or MAPE loop 408. Combined, the partial managers 406 perform a substantially complete MAPE loop 408. In the example illustrated in FIG. 4, a first autonomic manager 406b may perform the monitor 410 function or operation of the MAPE loop 408. The manual manager 406a may perform the analysis 412 function and the plan 414 function. A second autonomic manager 406c may perform the execute 416 function or operation to substantially complete the MAPE loop 408.

The composite manager 402 may also include a module 418, logic or the like adapted to provide a single overall or composite manager interface 420 for the set 404 of partial manager 406 to manage any manageable entities 422. The module 418 may be associated with an interface 424 to define the single manager interface 420. The module 418 may be similar to the module 232 described with reference to FIG. 2.

The composite manager 402 may also include a module 426, logic or the like adapted to provide a single overall or composite manageability interface 428 for the set 404 of managers relative to any managing entity or entities of the composite manager 402. The module 426 may be associated with an interface 430 to define the single overall or composite manageability interface 428. The module 426 may be similar to the module 242 of FIG. 2. The interface 430 allows the composite manager 402 to be managed by a separate orchestrating manager or the like, that may be at a higher level of abstraction. Similarly, interfaces 248 and 324 of FIGS. 2 and 3 respectively, allow their associated composite managers to be managed by a separate orchestrating manager that may be at a higher level of abstraction, like managing entity 246 in FIG. 2.

The composite manager 402 may also include a module 432, logic or the like for interaction between composite manager 402 and any other managers 434 or entities. The module 432 may be similar to the module 254 described with reference to FIG. 2.

The composite managers 202, 302 or 402 may each be constructed dynamically by building connections between the individual managers including appropriate coordination logic dynamically in an enterprise service bus or the like. In some cases, some pre-knowledge of what types of managers would make up a particular type of composite and what logic may be appropriate between them may be necessary, but the actual selection of specific managers and the connection between them is only done when a system requests a composite manager. A typical way this may be accomplished is through a "factory" that knows how to configure the various parts of a system to create an instance of a composite manager.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A computer system comprising:
a processor;
a composite manager operating on the processor, the composite manger comprising:
a set of partial autonomic managers, operating on the processor virtualized as a single entity to collectively appear and behave as a single autonomic manager to any external entity, each partial autonomic manager adapted to perform a part of a complete autonomic loop;
a module, operating on the processor, to provide a single manager interface for the set of partial autonomic managers to manage at least one entity, wherein the set of partial autonomic managers are coupled to the at least one entity being managed through the single manager interface, the module being connected to the at least one entity by a sensor and effector; and
a module, operating on the processor, to provide a single manageability interface for the set of partial autonomic managers relative to any managing entity of the composite manager, wherein the set of partial autonomic managers are coupled to any managing entity managing the composite manager through the single manageability interface, the module being connected to any managing entity by another sensor and effector.

2. The computer system of claim 1, further comprising a collaboration module for the set of partial autonomic managers to collaborate with one another.

3. The computer system of claim 1, further comprising at least one other module to provide an interface for interaction between the composite manager and any other managers.

4. The computer system of claim 1, further comprising:
another module to provide an interface for interaction between the composite manager and any other managers; and
a collaboration module for the set of partial autonomic managers to collaborate with one another.

5. The computer system of claim 4, wherein the module to provide a single manager interface, the module to provide a single manageability interface, the module to provide an interface for interaction and the collaboration module are formable as a single module.

6. The computer system of claim 4, wherein the module to provide a single manager interface, the module to provide a single manageability interface, the module to provide an interface for interaction and the collaboration module are formable as at least one distributed module.

7. The computer system of claim 4, wherein the set of partial autonomic managers form a distributed system with collaboration logic implemented in an infrastructure between the managers.

8. The computer system of claim 4, wherein the module to provide a single manageability interface is configured to perform at least one of:
accepting any requests for information sent to the composite manager;
gathering any information from the set of partial autonomic managers;
exposing any types of know-how the set of partial autonomic managers have between them;
accepting any requests to change behavior of the composite manager;
accepting any new know-how; and
passing any new information to an appropriate one of the set of partial autonomic managers; and
wherein the collaboration module is configured to perform at least one of:
coordinating interactions between the set of partial autonomic managers;
detecting any conflicts;
resolving any conflicts;
intercepting any requests from any of the set of partial autonomic managers; and
determining whether to at least one of pass on any request, modify any request, and reject any request.

9. The computer system of claim 8, wherein the module is formable as one of a single module and at least one distributed module.

10. The computer system of claim 1, wherein the set of partial autonomic managers comprises an orchestrating manager to manage at least two other managers of the set of partial autonomic managers.

11. The computer system of claim 1, wherein the set of partial autonomic managers comprises at least one manual manager.

12. An autonomic system, comprising:
a processor;
at least one composite manager operating on the processor, wherein the at least one composite manager comprises:
a set of partial autonomic managers virtualized as a single entity to collectively appear and behave as a single autonomic manager to any external entity, wherein each of the set of partial autonomic managers performs a predetermined part of a complete monitor-analyze-plan-execute (MAPE) autonomic computing loop;
a module to provide a single manager interface for the set of partial autonomic managers to manage at least one entity, wherein the set of partial autonomic managers are coupled to the at least one entity being managed through the single manager interface; and a module to provide a single manageability interface for the set of partial autonomic managers relative to any managing entity of the composite manager, wherein the set of partial autonomic managers are coupled to any managing entity managing the composite manager through the single manageability interface.

13. The autonomic system of claim 12, wherein the composite manager further comprises a collaboration module for the set of partial autonomic managers to collaborate with one another.

14. The autonomic system of claim 12, wherein the composite manager further comprises at least one other module to provide an interface for interaction between the composite manager and any other managers.

15. The autonomic system of claim 12, wherein the composite manager further comprises:

another module to provide an interface for interaction between the composite manager and any other managers; and a collaboration module for the set of partial autonomic managers to collaborate with one another.

16. The autonomic system of claim 12, wherein the module to provide a single manageability interface is configured to perform at least one of:

accepting any requests for information sent to the composite manager;

gathering any information from the set of partial autonomic managers;

exposing any types of know-how the set of partial autonomic managers have between them;

accepting any requests to change behavior of the composite manager;

accepting any new know-how;

passing any new information to an appropriate one of the set of partial autonomic managers; and wherein the collaboration module is configured to perform at least one of:

coordinating interactions between the set of partial autonomic managers;

detecting any conflicts;

resolving any conflicts;

intercepting any requests from any of the set of partial autonomic managers; and determining whether to at least one of pass on any request, modify any request, and reject any request.

17. The autonomic system of claim 12, wherein the set of partial autonomic managers comprises an orchestrating manager to manage at least two other managers of the set of managers.

18. A method to manage a system, comprising:

virtualizing a set of partial autonomic managers to collectively appear and behave as a single composite manager to any external entity, each partial autonomic manager adapted to perform a part of a complete autonomic loop;

forming a single manager interface for the set of partial autonomic managers to manage at least one entity, wherein the set of partial autonomic managers are coupled to the at least one entity being managed through the single manager interface; and forming a single manageability interface for the set of partial autonomic managers relative to any managing entity of the composite manager, wherein the set of partial autonomic managers are coupled to any managing entity managing the composite manager through the single manageability interface.

19. The method of claim 18, further comprising forming a collaboration module for the set of partial autonomic managers to collaborate with one another.

20. The method of claim 18, further comprising forming at least one other interface for interaction between the composite manager and any other managers.

21. The method of claim 18, wherein forming the set of partial autonomic managers comprises forming an orchestrating manager to manage at least two other managers of the set of managers.

22. A method to manage a system, comprising:

virtualizing a set of partial autonomic managers to collectively appear and behave as a single composite manager to any external entity, each partial autonomic manager adapted to perform a part of a complete autonomic loop;

managing at least one entity using a single manager interface for the set of partial autonomic managers, wherein the set of partial autonomic managers are coupled to the at least one entity being managed through the single manager interface; and managing the composite manager using a single manageability interface, wherein the set of partial autonomic managers are coupled to any managing entity managing the composite manager through the single manageability interface.

23. The method of claim 22, further comprising allowing collaboration among the set of partial autonomic managers.

24. The method of claim 22, further comprising:

accepting any requests for information sent to the composite manager;

gathering any information from the set of partial autonomic managers;

exposing any types of know-how the set of partial autonomic managers have between them;

accepting any requests to change behavior of the composite manager;

accepting any new know-how; and passing any new information to an appropriate one of the set of partial autonomic managers.

25. The method of claim 22, further comprising:

coordinating interactions between the set of partial autonomic managers to manage the at least one entity;

detecting any conflicts between the set of partial autonomic managers;

resolving any conflicts between the set of partial autonomic managers;

intercepting any requests from any of the set of partial autonomic managers to the at least one entity; and determining whether to at least one of pass on any request, modify any request, and reject any request.

26. The method of claim 23, wherein using the set of partial autonomic managers comprises using an orchestrating manager to manage at least two other managers of the set of partial autonomic managers.

27. A computer program product to manage a system, the computer program product comprising a non-transitory computer readable storage medium having computer readable program code embodied therewith, the computer readable storage medium comprising:

computer readable program code configured to virtualize a set of partial autonomic managers to collectively appear and behave as a single composite manager to any external entity;

computer readable program code configured to provide a single manager interface for the set of partial autonomic managers to manage at least one entity, wherein the set of partial autonomic managers are coupled to the at least one entity being managed through the single manager interface; and computer readable program code configured to provide a single manageability interface for the set of partial autonomic managers relative to any managing entity of the composite manager, wherein the set of partial autonomic managers are coupled to any managing entity managing the composite manager through the single manageability interface.

28. The computer program product of claim 27, further comprising computer readable program code configured to collaborate between the set of partial autonomic managers.

29. The computer program product of claim 27, further comprising computer readable program code configured to provide an orchestrating manager to manage at least two other managers of the set of partial autonomic managers.

* * * * *